United States Patent [19]
Künstler et al.

[11] Patent Number: 5,410,973
[45] Date of Patent: May 2, 1995

[54] PROCESS AND APPARATUS FOR THE INCINERATION OF SEWAGE SLUDGE AND REFUSE

[75] Inventors: Hans Künstler, Uitikon; Erwin Wachter, Zürich; Peter Nüesch, Bisikon; Kurt Scholl, Zofinger, all of Switzerland

[73] Assignee: Noell Abfall- und Energietechnik GmbH, Neuss, Germany

[21] Appl. No.: 24,161

[22] Filed: Feb. 26, 1993

[30] Foreign Application Priority Data

Jun. 28, 1991 [DE] Germany .............. 41 21 968

[51] Int. Cl.⁶ .................................. F23G 5/06
[52] U.S. Cl. ..................... 110/246; 110/222; 110/346; 110/106; 110/216
[58] Field of Search ........... 110/224, 226, 246, 216, 110/346, 106, 222

[56] References Cited

U.S. PATENT DOCUMENTS

| | | | |
|---|---|---|---|
| 4,121,524 | 10/1978 | Voelskow et al. | 110/222 |
| 4,245,571 | 1/1981 | Prezewdski | 110/246 |
| 4,583,468 | 4/1986 | Reed et al. | 432/106 |
| 4,745,869 | 5/1988 | Dilmore et al. | 110/246 |
| 4,890,563 | 1/1990 | White et al. | 110/246 |
| 4,922,841 | 5/1990 | Kent | 110/346 |
| 5,085,581 | 2/1992 | Mendenhall | 110/246 |
| 5,098,285 | 3/1992 | Bauer | 110/246 |
| 5,103,743 | 4/1992 | Berg | 110/246 |

FOREIGN PATENT DOCUMENTS

| | | |
|---|---|---|
| 3542004 | 6/1987 | Germany . |
| 3635068 | 4/1988 | Germany . |
| 3910215 | 10/1990 | Germany . |
| 54-063564 | 5/1979 | Japan . |
| 58-37416 | 3/1983 | Japan . |
| 149812 | 2/1989 | Japan . |

OTHER PUBLICATIONS

"Erfahrungen auf der Mulverbrennungs- und Schlammtrocknungsanlage Gluckstadt mit der gemeinsamen Verbrennung von Mull und Klarschlamm, Kommunalmirtschaft," Von Stadtbaumeister Georg Poock, Gluckstadt, Sep. 1965, pp. 383–388.

"Gemeinsame Verbrennung von festem und flussigem Abfall,", Wolfgang Vater, pp. D-01-D-15.

"Gemeinsame Erfassung und Entsorgung von Hausmull und Klarschlamm, Mischung von Klarschlamm mit Hausmull," Von Direktor Dipl.-Ing. Dieter O. Reimann, Bamberg, May 1990, pp. 296, 297, 300–304.

"Marktoberdorf: Verbrennung von Müll+Klärschlamm" Lurgi-Schnellinformation, 1975.

"Etagenofen kombiniert mit Müllverbrennung bei gemeinsamer Rauchgasreinigung (MKVA Marktoberdorf)", B. Pauli, 1989, pp. 96–99.

*Primary Examiner*—Henry C. Yuen
*Attorney, Agent, or Firm*—Thomas N. Ljungman

[57] ABSTRACT

Sewage sludge from municipal and industrial sewage systems can be incinerated in conjunction with the incineration of refuse in a refuse incinerator as environmentally safely as possible, with a favorable energy balance and low expenditures for technology and equipment. The sewage sludge can be fed into a rotary tubular kiln, while in a countercurrent, flue gas from a refuse incinerator can be passed through the rotary tubular kiln. The resulting vapors from the sewage sludge incineration can then be injected back into the refuse incinerator for afterburning, while the components of the vapors are useful for the reduction of the formation of nitrogen oxide during the incineration of the refuse.

20 Claims, 1 Drawing Sheet

PROCESS AND APPARATUS FOR THE INCINERATION OF SEWAGE SLUDGE AND REFUSE

This application is a Continuation-In-Part application of International Application No. PCT/DE92/00531, filed on Jun. 26, 1992, which claims priority from Federal Republic of Germany Patent Application No. P 41 21 968.6, filed on Jun. 28, 1991. International Application No. PCT/DE92/00531 was pending as of the filing date of U.S. application Ser. No. 08/024,161 and the U.S. was an elected state in International Application No. PCT/DE92/00531.

BACKGROUND OF THE INVENTION

1. Field of the Invention

This invention relates to a process for the incineration of sewage sludge and refuse. Sewage sludge from municipal or industrial sewage systems is preferably desiccated and then incinerated in conjunction with a refuse incinerator.

2. Background Information

Known processes for the harmless disposal of sewage sludge attempt to solve sewage disposal problems by means of drying the sludge and then incinerating the sludge. For example, German Laid Open Patent Application No. 35 42 004 discloses a process for drying sewage sludge with heated exhaust from a clinker cooling system during the manufacture of cement clinker. The process disclosed is specifically tailored to cement production. In addition, the sewage sludge, dried in a separate process stage, is fed as fuel into the sintering furnace.

Another example of a disposal process can be found in German Patent No. 36 35 068, which discloses a process for the detoxification of contaminated material as part of a degasification process which includes indirect heating. In this process, whereby the degasification stage involves indirect heating, the drying and incineration of contaminated material do not occur in the same process stage.

German Laid Open Patent Appln. No. 39 10 215 discloses a process for the drying and incineration of sewage sludge at a coal-fired power plant. Here, too, drying and incineration do not occur in the same process stage. The vapors are incinerated in the zone where the firing takes place and the dried sludge is added to the coal to be burned. Drying takes place indirectly using condensing steam. The vapors from the drying of the sewage sludge increase the flue gas volume during the burning of the coal.

Thus, a process in which the drying, carbonization and incineration of sewage sludge occur in one single process stage is not known. Further, it has been found that such a unified sewage treatment process can be suitable for the formation of reduction agents that are generally necessary for the removal of nitrogen which forms during refuse incineration. It is this combination of sewage treatment and refuse incineration that accounts for the success of the process according to the present invention.

OBJECT OF THE INVENTION

The object of the invention is to develop a process whereby sewage sludge from municipal and industrial sewage systems can be incinerated in combination with the incineration of refuse in a refuse incinerator in a manner which is as environmentally safe as possible, has a favorable energy balance, and also does not require a great expense for technology and equipment.

SUMMARY OF THE INVENTION

As discussed briefly above, it has been found that a single process stage for the drying, carbonization and incineration of sewage sludge can produce reduction agents in the exhaust vapors produced thereby, which reduction agents are usable for reducing nitrogen produced upon the incineration of refuse. Thus, conducting the exhaust from a sewage incineration stage to a refuse incinerator can be useful for providing reduction agents for the refuse incineration. Further, the heated exhaust gases from the refuse incineration can be used for the incineration and drying of the sewage sludge. Thus, a simple arrangement in which the exhaust from each of the sewage incineration and the refuse incineration are fed to the other can provide an efficient and environmentally safe waste treatment process.

To achieve this, the present invention teaches that sewage sludge, which can be partly desiccated to have a dry material content of about 20% to about 30%, can be fed into a rotary tubular kiln. In a countercurrent to the direction of flow of the sewage sludge through the kiln, flue gas, preferably at a temperature between about 600° C. to about 900° C., can be drawn from a refuse incinerator through the rotary tubular kiln. This feeding of the flue gas from the refuse incineration back through the rotary tubular kiln for incinerating sewage sludge both promotes firing in the rotary tubular kiln, and also allows the sewage sludge to be dried, carbonized and incinerated in preferably a single process stage. Such a single process stage utilizing the heat from the flue gas of refuse incineration can even be performed without necessarily requiring any additional external energy.

Further, in such a process as described above, vapors having a high proportion of uncombusted inorganic and organic gases, such as ammonia ($NH_3$), are formed in the rotary tubular kiln during the treatment of the sewage sludge. These vapors, in turn, can be injected back into a refuse incinerator for afterburning of the vapors. In the refuse incinerator, the uncombusted gases also can serve to reduce the formation of nitrogen oxides which can be produced during the incineration of refuse. The operation of the refuse incinerator is only slightly disrupted by such a recycling of exhaust gases because the heat removed to the sewage incineration in the form of hot gases is essentially returned to the refuse incinerator in the form of sensible heat and uncombusted gases having high calorific values.

By means of the process according to the present invention in which the exhaust from each of the refuse and sewage sludge incinerators is fed to the other incinerator, refuse/sludge wastes with combined calorific values of up to about 7000 kJ/kg can be incinerated without necessarily requiring any additional energy beyond that used by the refuse incinerator. This would essentially not be possible without the use of additional energy if the individual components were mixed and incinerated in the same furnace. Existing refuse incinerators can even be retrofitted for this process without requiring extensive modification of the sequential incineration stages, such as boiler, filter, exhaust scrubbers, head of the chimney, etc., because the amount of flue gas from refuse incineration does not increase for a constant throughput of refuse. Because the amount of flue gas remains the same, the absolute emissions load of the entire system is less than the emissions load from the incineration of the individual components in separate systems. In addition, the formation of nitrogen oxide in the refuse incinerator can also be reduced by means of the process according to the invention, since the gases produced in the carbonization and drying zones of the sewage sludge rotary tubular kiln, that is, primarily $NH_3$, essentially act as reduction agents.

One aspect of the invention resides broadly in a process for the incinerating sewage sludge in an incineration apparatus. The process comprises the steps of: conducting sewage sludge to the incineration apparatus, the incineration apparatus having a loading end, a discharge end, and an incineration chamber therebetween; loading sewage sludge into the loading end of the incineration apparatus; combusting the sewage sludge in the incineration chamber to produce combusted sewage sludge and exhaust; at least partially heating the sewage sludge with heated flue gas from a refuse incinerator to provide at least a portion of the heat for the combustion of the sewage sludge; and removing the combusted sewage sludge from the discharge end of the incineration apparatus.

Another aspect of the invention resides broadly in a process for conjunctively incinerating refuse and sewage sludge in an incineration device. The incineration device comprises a first incineration apparatus for incinerating the sewage sludge and second incinerating apparatus for incinerating the refuse. The process comprises the steps of: conducting sewage sludge to the first incineration apparatus, the first incineration apparatus having a loading end, a discharge end, and an incineration chamber therebetween; loading the sewage sludge into the loading end of the first incineration apparatus; incinerating the sewage sludge in the incineration chamber of the first incineration apparatus to produce incinerated sewage sludge and exhaust gases; conducting refuse to the second incineration apparatus, the second incineration apparatus having a loading end, a discharge end, and an incineration chamber therebetween; loading the refuse into the loading end of the second incineration apparatus; incinerating the refuse in the incineration chamber of the second incineration apparatus to produce incinerated refuse and heated flue gas; conducting at least a portion of the heated flue gas from the second incineration apparatus to the first incineration apparatus to provide at least a portion of the heat for the combustion of the sewage sludge; removing the combusted sewage sludge from the discharge end of the first incineration apparatus; and conducting the exhaust gases from the first incineration apparatus to the second incineration apparatus to combust the exhaust gases from the first incineration apparatus.

Another aspect of the invention resides broadly an apparatus for conjunctively incinerating refuse and sewage sludge. The apparatus comprises a first incineration apparatus for incinerating the sewage sludge, the first incineration apparatus comprising a loading end for loading sewage sludge into the first incineration apparatus, an incineration chamber for incinerating sewage sludge to form incinerated sewage sludge and exhaust gases, and a discharge end for removing incinerated sewage sludge from the first incineration apparatus; a second incineration apparatus for incinerating refuse, the second incineration apparatus comprising, a loading end for loading refuse into the first incineration apparatus, an incineration chamber for incinerating refuse to form incinerated refuse and heated flue gas, and a discharge end for discharging incinerated refuse from the second incineration apparatus; apparatus for conducting at least a portion of the heated flue gas from the second incineration apparatus to the first incineration apparatus to provide at least a portion of the heat for the incineration of the sewage sludge; and apparatus for conducting the exhaust gases from the first incineration apparatus to the second incineration apparatus to combust the exhaust gases from the first incineration apparatus and react reducing agents in the exhaust gases with nitrogen oxides in the flue gas.

BRIEF DESCRIPTION OF THE DRAWINGS

The process according to the invention is explained in greater detail below, with reference to the accompanying schematic illustrations, in which.

DESCRIPTION OF THE PREFERRED EMBODIMENT

Figure 1:
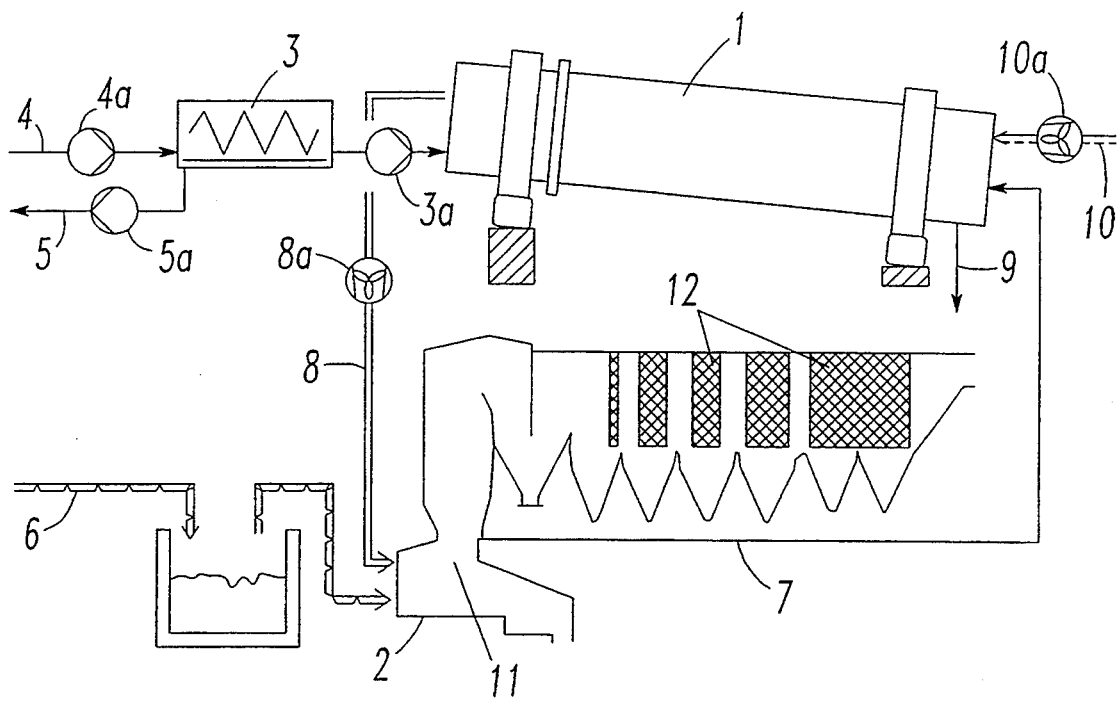
FIG. 1 shows a rotary tubular kiln for sewage sludge combustion in combination with a refuse incinerator for combustion of refuse.

FIG. 1 shows one arrangement, according to the present invention, of a rotary tubular kiln 1 in combination with a refuse incinerator 2. In such a system, sewage sludge 4 is preferably fed first into a mechanical dessicator, or dehydrator 3 by means of pump 4a. Such a dehydrator, or dessicator 3 can be of a type known in the art. In the dessicator 3, the sewage sludge can preferably be at least partially desiccated to have a dry substance content between about 20% to about 30%, however, sludges having dry substance contents outside of this range are also feasibly usable in the incineration process according to the present invention. For example, sludges with dry substance contents of between about 5% to about 20% and about 30% to about 50% may also be usable, but may result in decreased efficiency. Such a dessicating system can also have return piping 5 which could possibly, by means of pump 5a, be used for transporting the water removed from the sewage sludge, or possibly for redirecting sewage sludge having too high of a moisture content back to a sludge storage area for return to the dehydrating stage.

The partially dried sewage sludge from the dessicator 3 can then be transferred to a rotary tubular kiln 1 for incineration of the sewage sludge. While a rotary tubular kiln 1 is the preferred apparatus for incineration of the sewage sludge according to the present invention, other types of incinerator apparatus known in the art may also be usable in such an arrangement. As the sewage sludge is passed through the rotary kiln 1, a countercurrent of flue gas 7, preferably at a temperature of between about 600 degrees C. to about 900 degrees C. is drawn from the refuse incinerator 2 through the rotary tubular kiln 1. If necessary, additional combustion air 10 can be vented into the rotary tubular kiln 1 by means of blower 10a to provide a proper firing within the kiln.

Figure 2:
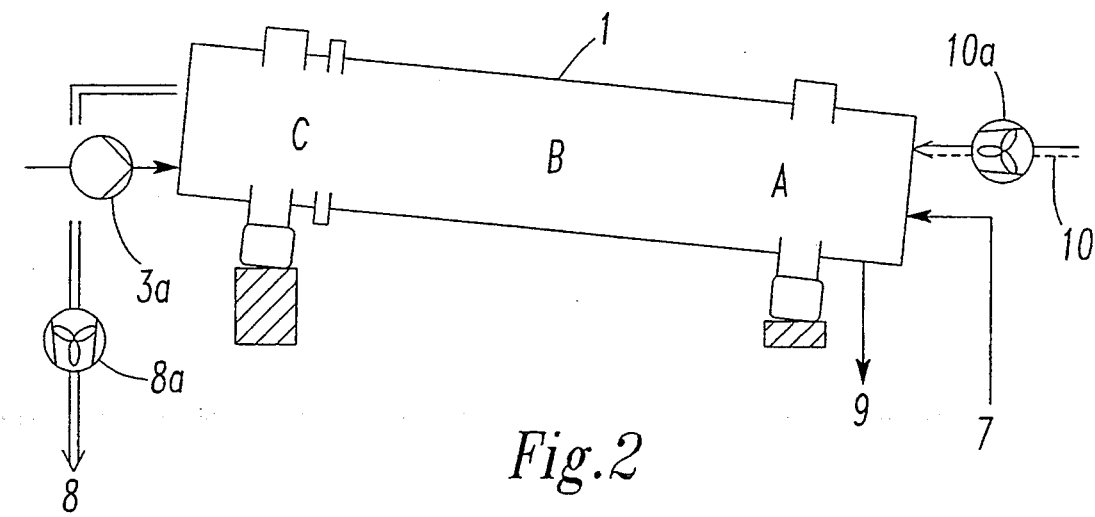
FIG. 2 shows an enlarged detail of a rotary tubular kiln.

With reference to FIG. 2, the flue gas is preferably introduced in a combustion and flame zone (A) of the rotary tubular kiln 1 and then preferably flows over the gasification and degasification zone, or carbonization zone (B) to the drying zone (C). In passing from the combustion zone to the drying zone, the flue gas is gradually and continuously cooled. Thus, the sewage sludge is essentially first dried in the drying zone (C) by flue gas at a temperature which might be in a range of between about 200° C. to about 300° C. The dried sewage sludge then passes to carbonization zone (B) where the sludge can be carbonized by flue gas which might be at a temperature within a range of about 300° C. to about 600° C. Lastly, the carbonized, degassified sewage sludge can then pass into the incineration zone (A) where the sewage sludge can be incinerated in the presence of the flue gas having a temperature in a range of about 600° C. to about 900° C. These temperature ranges are only approximations, and such ranges could extend to greater or lower temperatures depending on the operating conditions.

At temperatures between about 700 degrees C. to about 300 degrees C., and at oxygen contents below about 5% by volume (wet) behind the flame front, pyrolysis gases and highly volatile gases can be released from the flue gas. This can result in a high proportion of uncombusted gases in the vapors 8, which vapors can preferably be cycled to the refuse incinerator 2, by means of blower 8a, for afterburning of the vapors 8. In addition to ammonia, which is formed primarily in the drying zone (C), other inorganic and organic gases can be formed in the kiln 1, which gases also can be used to reduce the formation of nitrogen oxide during the incineration of the refuse. With a refuse/sludge ratio of 4 (sludge: approximately 100% dry material), nitrogen oxide values of 100 mg/Nm$^3$ based on 11% $O_2$ can be achieved.

The vapors 8 formed during the sludge incineration in the rotary tubular kiln 1 can preferably be injected back into a refuse incinerator 2, and preferably into a firing, or incineration chamber 11 of the refuse incinerator. Any of various known types of refuse incinerators could be used for carrying out the process according to the present invention. The vapors 8 can be further incinerated in the firing chamber 11 of the incinerator 2. Normal operation of the refuse incinerator 2 may only be slightly disrupted by the injection of the vapors 8 because the heat removed from the refuse incinerator 2 in the form of hot gases is essentially returned to the refuse incinerator in the form of sensible heat, gases with high calorific values, and uncombusted gases. Any exhaust gases not withdrawn from the refuse incinerator to the rotary tubular kiln can essentially be fed through a system of filters and exhaust scrubbers 12 for removal of any additional environmental pollutants, before releasing the exhaust into the atmosphere.

The incinerated sewage sludge formed in the rotary tubular kiln can essentially be discharged from the kiln in the form of slag 9, which can be either placed in a landfill or made available for other applications.

One feature of the invention resides broadly in the process for the combined incineration of sewage sludge and refuse, characterized by the fact that a) the sewage sludge 4, which has been partly desiccated to 20 to 30% dry material content, is fed into a rotary tubular kiln 1, b) to promote firing, flue gas 7 at a temperature of 600 to 900 degrees C. is drawn from a refuse incinerator 2 through the rotary tubular kiln in a countercurrent, c) the resulting vapors 8, which contain a high proportion of uncombusted inorganic and organic gases, as well as ammonia, are injected into the refuse incinerator 2 for afterburning, d) formation of nitrogen oxide during the incineration of refuse is thereby reduced.

Another feature of the invention resides broadly in the process, characterized by the fact that the drying, carbonization and incineration of the partly desiccated sewage sludge in the rotary tubular kiln 1 take place in a single process stage.

Yet another feature of the invention resides broadly in the process, characterized by the fact that the drying, carbonization and incineration of the partly desiccated sewage sludge take place in a rotary tubular kiln 1 without additional external energy.

Various apparatuses and processes for dehydrating and incinerating sewage sludge which could possibly be used in the context of the present invention are more fully disclosed in the following U.S. Patents: U.S. Pat. No. 5,057,009 to Nechvatal and Heian, entitled "Lightweight Aggregate from Flyash and Sewage Sludge"; U.S. Pat. No. 4,949,654 to Wilson Porter, entitled "Incinerator for Combusting Sewage"; U.S. Pat. No. 3,913,500 to James Paccione and David Omeara, entitled "Heat Treatment of Waste Sludges"; U.S. Pat. No. 3,954,069 to Per Loken, entitled "Process and Apparatus for the Incineration of Aqueous Sewage Sludge"; U.S. Pat. No. 4,050,900 to Jim Hobbs and Craig Smyser, entitled "Incineration Apparatus"; U.S. Pat. No. 4,196,077 to Berkowitz et al., entitled "Sewage Sludge Dewatering"; U.S. Pat. No. 4,202,282 to Jim Hobbs and Craig Smyser, entitled "Method of Incineration"; U.S. Pat. No. 4,311,103 to Yasuo Hirose, entitled "Incineration System for Sewage Sludge"; and U.S. Pat. No. 4,906,388 to Frank Cain and Lawrence Gasper, entitled "Sewage Sludge Dewatering Process".

Various apparatuses and processes for incinerating refuse which could possibly be used in the context of the present invention are more fully disclosed in the following U.S. Patents: U.S. Pat. No. 4,006,693 to Hans Kunstler, entitled "Combustion Furnace Construction Particularly a Refuse Incinerator"; U.S. Pat. No. 4,516,511 to Tsung Kuo, entitled "Refuse Incineration Apparatus"; U.S. Pat. No. 4,706,560 to Gaetano Capodicasa, entitled "Refuse Treatment Apparatus"; U.S. Pat. No. 4,936,231 to Loyd Johnson, entitled "Solid Waste Garbage Incineration System"; U.S. Pat. No. 4,949,653 to James Rast, entitled "Process and Apparatus for Incineration"; and U.S. Pat. No. 5,009,173 to Sedat Temelli, entitled Apparatus for Incineration of Refuse.

Similarly, various apparatuses and process for cleaning of the flue gases which could possibly be used in the context of the present invention are more fully disclosed in the following U.S. Patents: U.S. Pat. No. 5,018,457 to Brady et al., entitled "Waste Treatment System"; U.S. Pat. No. 5,050,508 to Paul Wilson, entitled "System for the Incineration of Refuse and the Treatment of the Incineration Exhaust Gasses"; and U.S. Pat. No. 5,127,347 to Eric Cheetham, entitled "Method and Apparatus for the Reduction of Solid Waste Material Using Coherent Radiation". And filter arrangements can be found in the following U.S. Patent: U.S. Pat. No. 4,416,674 to McMahon et al., entitled "Filter for Treating a Particle-Carrying Gaseous Stream"; U.S. Pat. No.: 4,862,813 to Levin et al., entitled "High Temperature Gas Cleaning in Municipal Solid Waste Incineration Systems"; U.S. Pat. No.: 4,971,769 to Hans Haerle, entitled "Filter Device of use in Heating or Incineration Plants".

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A process for incinerating sewage sludge in a first incineration apparatus, said first incineration apparatus comprising a separate and integral incineration apparatus, said first incineration apparatus comprising means for incineration of sewage sludge at a temperature sufficient for incineration of sewage sludge, said process comprising the steps of:

conducting sewage sludge to said first incineration apparatus, said first incineration apparatus having a loading end, a discharge end, and an incineration chamber therebetween;

loading sewage sludge into the loading end of said first incineration apparatus;

combusting the sewage sludge in said incineration chamber to produce combusted sewage sludge and exhaust;

at least partially heating the sewage sludge in said first incineration apparatus with heated flue gas from a second incineration apparatus to provide at least a portion of the heat for the combustion of the sewage sludge, said second incineration apparatus comprising a separate and integral incineration apparatus, said second incineration apparatus comprising means for incineration of refuse at a temperature sufficient for incineration of reuse, and said first and second incineration apparatus being substantially non-integral with respect to one another, and said first incineration apparatus being separate and disposed away from said second incineration apparatus; and removing the combusted sewage sludge from the discharge end of said first incineration apparatus.

2. The process according to claim 1, wherein said combusting of the sewage sludge in said first incineration apparatus comprises the steps of
   drying the sewage sludge,
   carbonizing the dried sewage sludge, and
   incinerating the carbonized sewage sludge in a single incineration chamber of said first incineration apparatus.

3. The process according to claim 2, further including the steps of drying, carbonizing and incinerating the sewage sludge in said first incineration apparatus with only said heated flue gas from a second refuse incineration apparatus.

4. The process according to claim 3, further including the step of conducting the exhaust from said first incineration apparatus to a combustion chamber of a second refuse incineration apparatus for cleaning of the exhaust gases from said first incineration apparatus.

5. The process according to claim 4, wherein the sewage sludge comprises sewage sludge from one of: a municipal sewage system and an industrial sewage system, and said process further comprises:

incinerating refuse in a combustion chamber of a second refuse incineration apparatus in conjunction with said incinerating of sewage sludge in said first incineration apparatus, said refuse incineration producing the heated flue gas for combusting the sewage sludge in said first incineration apparatus; and conducting at least a portion of the heated flue gas from the combustion chamber of said second refuse incineration apparatus to said first incineration apparatus to provide said heat for said combustion of the sewage sludge in said first incineration apparatus.

6. The process according to claim 5, wherein: incineration of refuse produces nitrogen oxides in the flue gas of said second refuse incineration apparatus; combustion of sewage sludge produces reducing agents in the exhaust gases of said first incineration apparatus; and said process further comprises:

producing nitrogen oxides during said incineration of refuse in said combustion chamber of said second incineration apparatus;

producing reducing agents during said incineration of sewage sludge in said first incineration apparatus;

conducting the reducing agents in the exhaust gases of said first incineration apparatus to said combustion chamber of said second refuse incineration apparatus;

introducing the reducing agents into said combustion chamber of said second refuse incineration apparatus;

reacting the reducing agents with the nitrogen oxides in said combustion chamber of said second incineration apparatus to reduce nitrogen oxide in the flue gas of said second incineration apparatus; and reducing nitrogen oxides in said second refuse incineration apparatus.

7. The process according to claim 6, further including:

conducting the sewage sludge to dehydrating means prior to loading the sewage sludge into said first incineration apparatus;

removing water from the sewage sludge in said dehydrating means to produce at least partially dehydrated sewage sludge; and conducting the at least .partially dehydrated sewage sludge from said dehydrating means to the loading end of said first incineration apparatus for loading of the at least partially dehydrated sewage sludge into said first incineration apparatus.

8. The process according to claim 7, wherein:
   said removing of water further comprises:
   predetermining a dry material content of the sewage sludge; and
   at least one of:
      removing additional water from the sewage sludge when the sewage sludge has a dry material content less than about 20% to about 30% dry material; and
      conducting the at least partially dehydrated sewage sludge to said first incineration apparatus when the sewage sludge has a dry material content of about 20% to about 30% dry material;

the exhaust gas from said first incineration apparatus comprises at least one of: uncombusted organic gases and uncombusted inorganic gases, the uncombusted inorganic gases comprising ammonia, and the ammonia comprising a reducing agent for reducing nitrogen oxides; and said combustion of sewage sludge in said first incineration apparatus comprises combustion of partially dehydrated sewage sludge in a rotary tubular kiln.

9. The process according to claim 8, wherein said rotary tubular kiln comprises three zones from the loading end to the discharge end, the three zones comprising: a drying zone, a carbonization zone, and an incineration zone, and said process further includes:

passing the heated flue gas through said rotary tubular kiln from the discharge end of said kiln to the loading end of said kiln in a countercurrent to the flow of sewage sludge from the loading end of the kiln to the discharge end of said kiln to dry the sewage sludge ub said drying zone, carbonize the sewage sludge is said carbonization zone and incinerate the sewage sludge in said incineration zone; and adding additional combustion air to said incineration zone of said rotary tubular kiln through the discharge end of said kiln to maintain proper combustion in the incineration zone.

10. The process according to claim 9, further including:

passing at least a portion of the flue gas from said second refuse incineration apparatus and the combusted exhaust gases from said first incineration apparatus to gas cleaning means; and cleaning the at least a portion of the flue gases and the combusted exhaust gases in said gas cleaning means;

conducting the exhaust gases from said incineration apparatus to said refuse incinerator with first blower means; pumping sewage sludge into said dehydrator means with first pump means;

pumping the at least partially dehydrated sewage sludge from said dehydrator means to the loading end of said first incineration apparatus with second pump means;

introducing the additional combustion air into said incineration apparatus with second blower means;

said gas cleaning means comprising filters and gas scrubbers;

said dehydrating means comprising mechanical dessicating means; and the flue gas conducted to said incineration apparatus being at a temperature of between about 600° C. to about 900° C.

11. The process according to claim 1, wherein said first incineration apparatus comprises a rotary tubular kiln, and said process further comprises the steps of:

conducting the exhaust from said rotary tubular kiln to a combustion chamber of a refuse incinerator for further cleaning of the exhaust gases; and at least partially dehydrating the sewage sludge in dehydrating means to produce at least partially dehydrated sewage sludge prior to loading the sewage sludge into said rotary tubular kiln.

12. The process according to claim 11, wherein: incineration of sewage sludge in said rotary tubular kiln produces reducing agents in the exhaust gases; incineration of refuse produces nitrogen oxides in the flue gas of said second refuse incineration apparatus; and said process further includes the steps of:

incinerating refuse in a combustion chamber of a second refuse incineration apparatus in conjunction with said incinerating of sewage sludge in said first incineration apparatus, said refuse incineration producing the heated flue gas;

producing nitrogen oxides in the heated flue gas during said incineration of refuse in said combustion chamber of said second refuse incineration apparatus;

producing reducing agents in the exhaust gases during incineration of sewage sludge in said first incineration apparatus;

conducting the reducing agents in the exhaust gases of said first incineration apparatus to said combustion chamber of said second refuse incineration apparatus;

introducing the reducing agents into said combustion chamber of said second refuse incineration apparatus;

reacting the reducing agents with the nitrogen oxides in said combustion chamber of said second incineration apparatus to reduce nitrogen oxide in the flue gas of said second incineration apparatus; and reducing nitrogen oxides in said second refuse incineration apparatus.

13. A process for conjunctively incinerating refuse and sewage sludge in incineration means, said incineration means comprising first incineration apparatus for incinerating the sewage sludge, said first incineration apparatus comprising means for incinerating sewage sludge at a temperature sufficient for incineration of sewage sludge, said first incineration apparatus comprising a separate and integral incineration apparatus and second incinerating apparatus for incinerating the refuse, said second incineration apparatus comprising means for incinerating refuse at a temperature sufficient for incineration of refuse, said second incineration apparatus comprising a separate and integral incineration apparatus; said first incineration apparatus being separate and disposed away from said second incineration apparatus, and said first and second incineration apparatus being substantially non-integral with respect to one another, said process comprising the steps of:

conducting sewage sludge to said first incineration apparatus, said first incineration apparatus having a loading end, a discharge end, and an incineration chamber therebetween;

loading the sewage sludge into the loading end of said first incineration apparatus;

incinerating the sewage sludge in the incineration chamber of said first incineration apparatus to produce incinerated sewage sludge and exhaust gases;

conducting refuse to said second incineration apparatus, said second incineration apparatus having a loading end, a discharge end, and an incineration chamber therebetween;

loading the refuse into the loading end of said second incineration apparatus;

incinerating the refuse in the incineration chamber of said second incineration apparatus to produce incinerated refuse and heated flue gas;

conducting at least a portion of the heated flue gas from said second incineration apparatus to said first incineration apparatus to provide at least a portion of the heat for the combustion of the sewage sludge;

removing the combusted sewage sludge from the discharge end of said first incineration apparatus; and conducting the exhaust gases from said first incineration apparatus to said second incineration apparatus to combust the exhaust gases from said first incineration apparatus.

14. The process according to claim 13, wherein incineration of refuse produces nitrogen oxides in the flue gas of said second incineration apparatus; combustion of sewage sludge produces reducing agents in the exhaust gases of said first incineration apparatus; and said process further includes:

producing nitrogen oxide as a component of the heated flue gas in the incineration chamber of said second incineration apparatus during said incineration of the refuse;

producing at least one reducing agent in the exhaust gases of said first combustion apparatus during said incineration of the sewage sludge;

conducting the reducing agents in the exhaust gases of said first incineration apparatus to said combustion chamber of said second incineration apparatus;

introducing the reducing agents into said combustion chamber of said second refuse incineration apparatus;

reacting the reducing agents with the nitrogen oxides in said combustion chamber of said second incineration apparatus to reduce nitrogen oxide in the flue gas of said second incineration apparatus; and reducing nitrogen oxide in said second incineration apparatus.

15. The process according to claim 14, further including:

conducting the sewage sludge to dehydrating apparatus prior to loading the sewage sludge into said first incineration apparatus;

removing water from the sewage sludge in said dehydrating apparatus to produce at least partially dehydrated sewage sludge; and conducting the at least partially ,dehydrated sewage sludge from said dehydrating apparatus to the loading end of said first incineration apparatus for loading of the at least partially dehydrated sewage sludge into said first incineration apparatus; and passing the at least a portion of the flue gas through said first incineration chamber in a direction from the discharge end of said first incineration apparatus to the loading end of said first incineration apparatus.

16. The process according to claim 15, wherein said combusting of sewage sludge in said first incineration apparatus comprises the steps of:

drying the partially dehydrated sewage sludge, carbonizing the dried sewage sludge, and incinerating the carbonized sewage sludge, in a single incineration chamber of said first incineration apparatus.

17. The process according to claim 16, further including drying, carbonizing and incinerating said partially dehydrated sewage sludge in said first incineration apparatus with only said heated flue gas from said second incineration device.

18. The process according to claim 17, wherein:

said first incineration apparatus comprises a rotary tubular kiln;

the at least a portion of the flue gas from said second incineration apparatus is at a temperature of between about 600° C. to about 900° C.;

the exhaust gas from said first incineration apparatus comprises at least one of: uncombusted inorganic gases and uncombusted organic gases;

the reducing agent comprises the uncombusted gases, the uncombusted gases comprising ammonia;

the dehydrated sewage sludge comprises about 20% to about 30% dry material content;

said dehydrating apparatus comprises mechanical dessicating means; and said method further comprises the steps of:

adding additional combustion air into the discharge end of said first incineration apparatus;

conducting a remaining portion of the heated flue gas and the combusted exhaust gases from the incineration chamber of the second incineration apparatus to gas cleaning means, said gas cleaning means comprising filters and gas scrubbers;

conducting the exhaust gases from said first incineration apparatus to said second incineration apparatus with first blower means;

pumping sewage sludge into said dehydrator means with first pump means;

pumping the at least partially dehydrated sewage sludge from said dehydrator means to the loading end of said first incineration apparatus with second pump means; and introducing the additional combustion air into said first incineration apparatus with second blower means.

19. Apparatus for conjunctively incinerating refuse and sewage sludge, said apparatus comprising:

first incineration apparatus for incinerating the sewage sludge, said first incineration apparatus comprising means for incineration of sewage sludge at a temperature sufficient for incineration of sewage sludge;

said first incineration apparatus comprising:

a loading end for loading sewage sludge into said first incineration apparatus;

an incineration chamber for incinerating sewage sludge to form incinerated sewage sludge and exhaust gases; and a discharge end for removing incinerated sewage sludge from said first incineration apparatus;

second incineration apparatus for incinerating refuse, said second incineration apparatus comprising means for incineration of refuse at a temperature sufficient for incineration of refuse;

said second incineration apparatus comprising:

a loading end for loading refuse into said first incineration apparatus;

an incineration chamber for incinerating refuse to form incinerated refuse and heated flue gas; and a discharge end for discharging incinerated refuse from said second incineration apparatus;

said first incineration apparatus being separate from and substantially non-integral with said second incineration apparatus;

means for conducting at least a portion of the heated flue gas from said second incineration apparatus to said first incineration apparatus to provide at least a portion of the heat for the incineration of the sewage sludge; and means for conducting the exhaust gases from said first incineration apparatus to the second incineration apparatus to combust the exhaust gases from the first incineration apparatus and react reducing agents in said exhaust gases with nitrogen oxides in the flue gas.

20. The apparatus according to claim 19, wherein:

said first incineration apparatus comprises a rotary tubular kiln;

said means for conducting at least a portion of the heated flue gas from said second incineration apparatus to said first incineration apparatus comprises means for conducting said at least a portion of the heated flue gas from said incineration chamber of said second incineration apparatus to said discharge end of said first incineration apparatus; said means for conducting the exhaust gases from said first incineration apparatus to said second incineration apparatus comprises means for conducting the exhaust gases from said loading end of said first incineration apparatus to said incineration chamber of said second incineration apparatus; and said apparatus further comprises:

dehydration means for dehydrating sewage sludge to a dry material content of between about 20% to about 30% dry material;

means for conducting sewage sludge to said dehydration means prior to incinerating said sewage sludge;

means for conducting the dehydrated sewage sludge to said first incineration apparatus;

means for introducing additional combustion air into said incineration chamber of said first incineration apparatus; and gas cleaning means for cleaning pollutants from the flue gas and exhaust gas, said gas cleaning means being connected to said incineration chamber of said second incineration apparatus, and said gas cleaning means comprising at least filters and gas scrubbers.

* * * * *

UNITED STATES PATENT AND TRADEMARK OFFICE
CERTIFICATE OF CORRECTION

PATENT NO. : 5,410,973
DATED : May 2, 1995
INVENTOR(S) : Hans KÜNSTLER, Erwin WACHTER, Peter NÜESCH and Kurt SCHOLL It is certified that error appears in the above-indentified patent and that said Letters Patent is hereby corrected as shown below:

On the title page, after item [22] insert the following Continuing Application Data:

--Related International Application Data
[63]  Continuation-in-part of International Application No. PCT/DE92/00531, filed June 26, 1992.--

In column 1, after the title, insert the following heading:
        --CONTINUING APPLICATION DATA--.

In column 9, line 22, Claim 9, after 'sludge', delete "ub" and insert --in--.

In column 11, line 43, Claim 15, after 'partially', delete ",dehydrated" and insert --dehydrated--.

Signed and Sealed this

Seventeenth Day of December, 1996

Attest:

BRUCE LEHMAN

*Attesting Officer*      *Commissioner of Patents and Trademarks*